May 15, 1928.  
A. M. DEVEREUX  
1,669,695  
PENDANT CROSSING GUARD WITH DEFLECTOR  
Filed April 2, 1925
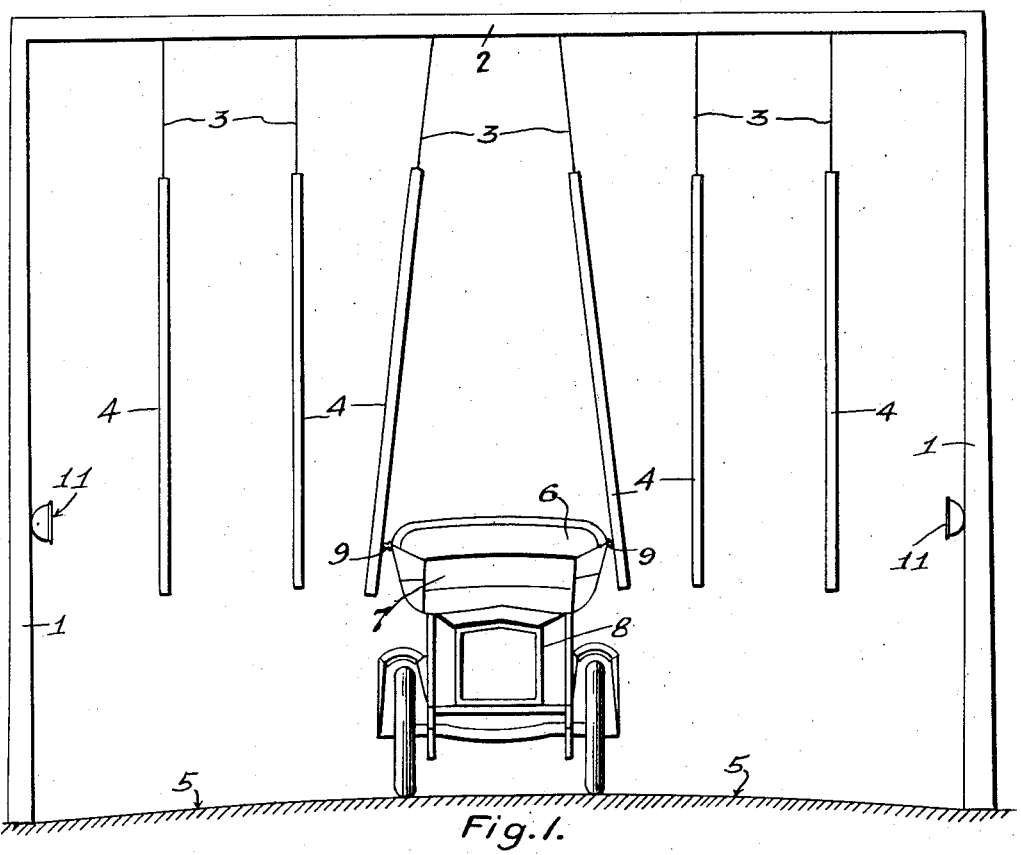
Fig. 1.
Fig. 2.
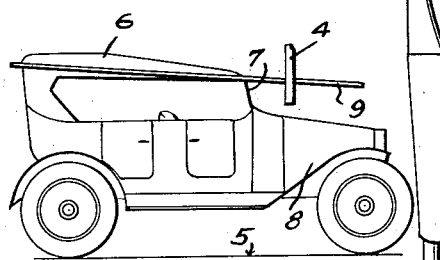
Fig. 3.
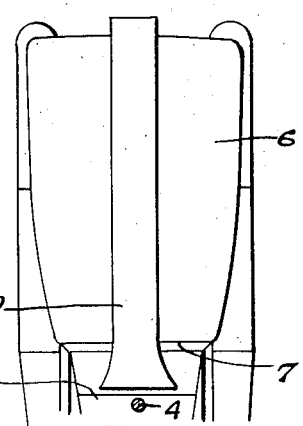
Fig. 4.
Inventor  
Arthur M. Devereux  
Castine, Maine Patented May 15, 1928.

1,669,695

UNITED STATES PATENT OFFICE.

ARTHUR M. DEVEREUX, OF CASTINE, MAINE.

PENDANT CROSSING GUARD WITH DEFLECTOR.

Application filed April 2, 1925. Serial No. 20,222.

The object of this invention is to protect lives and property at railway and other crossings from injury and destruction, by inducing the operators and occupants of automobiles and other vehicles, through fear of their own injury and damage to their automobiles and other vehicles, at the moment of or before entering upon the railroad property or other crossings.

To so retard the progress of their automobiles or other vehicles as to always come to a standstill or to extremely slow speed, before crossing the railroad track or other crossings:

To induce operators and occupants of automobiles and other vehicles to avail themselves of ample time and opportunity to look and listen for approaching trains before crossing railroad tracks, thus contributing to their own and others' safety:

To eliminate the necessity of crossing tenders.

Most important of all, to protect the lives and limbs of the employees and passengers of railroad trains, especially of the passengers who are grouped together in large numbers absolutely powerless to protect themselves from the consequences of collisions with automobiles and other vehicles.

Fig. 1 is a vertical front elevation of my invention.

Fig. 2 is a top view of a vehicle provided with operating guards.

Fig. 3 is a side view of the same.

Fig. 4 is a top view of a modification.

It being understood that whatever means are adopted for safe passage through the guard, it is only possible if the speed of the vehicle is extremely low, in fact a mere crawl.

The invention consists of a crossing guard Fig. 1, erected at or near a railroad right of way, and a cross road, 5, which crosses the railroad property. It consists of uprights 1, of wood, iron or other suitable material set in the ground on each side of the road 5. Connecting the top of these uprights is a beam 2, of sufficient stiffness and strength to enable it to carry its load without sagging, preferably an I beam with a cross section of 2" x 4" or more, set on edge.

From this beam are suspended, preferably by chain or wire rope 3, pendants 4, consisting of iron rods or other heavy material of sufficient weight and volume to injure automobiles or other vehicles if collided with at more than an extremely slow speed, but easily deflected sidewise or upward by an automobile or other vehicle operated at extremely slow speed, thus permitting safe passage through the guard.

These pendants 4, are so spaced that one at least must be deflected sidewise or upward to permit of open way for passage. The line of the bottom of the pendants 4, should conform to the surface of the roadway 5, and far enough above it to clear the hoods 8, but not the windshield 7, or the tops of automobiles 6.

The height of the uprights 1, and the beam 2, and the length of the suspending chains or ropes 3, and of the pendants 4, should be such as to permit of sufficient deflection sidewise or upward of the pendants 4, as to afford free space for passage.

Instead of the chains or ropes 3, and the pendants 4, continuous rods of iron, wood or other material of sufficient size and weight to serve the same purpose, may be used.

For the deflection of the pendants 4, sidewise to allow for free passage of automobiles or other vehicles, one or more occupants may alight and hold one or more pendants 4, aside by hand without any special appliance attached to the automobile or other vehicle.

For the deflection of the pendants 4, sidewise to admit of free passage of automobiles, electric cars or other vehicles without the occupants alighting, deflection rods 9, may be attached to each side of the top of the automobile, electric cars or other vehicles and extending in front of the top bending toward the center line of the car, or to a junction at said center.

If the pendants 4, are so spaced as to admit of free passage of the car by deflecting one pendant 4, only, one deflection rod 9, on one side of the car only will be sufficient.

The deflection rods 9, must be of sufficient weakness as to crumple or break when forced against a pendant 4, at more than extremely slow speed and thus the wind shield 7, and the top of the car 6, be injured, by being driven against the pendant 4, with destructive force. Yet the deflection rods 9, must be of sufficient strength to push a pendant 4, aside when the car is going at extremely slow speed and strong enough to guide a pendant 4, along the side of the top of the car 6, as it passes through the space thus opened in the crossing guard.

In the case of open cars or other vehicles deflection rods 9, may be attached to posts or standards at the corners of the car or to the running boards.

To deflect a pendant 4, upward to permit an automobile or other vehicle to pass under it safely at slow speed, a trough of iron or other suitable material 10, may be secured along the center of the top of automobile or other vehicle 6, extending from front to ack which will guide the pendant 4, along its course as the car passes under it, or a strip of any suitable material, like a rubber mat, laid over the top of automobile or other vehicle 6, to protect it from injury.

In the case of an automobile or other vehicle, without a top or with the top turned back, the trough 10, may be secured to the center of the top of the wind shield 7, and extend backward over the center of the automobile or other vehicle and secured at the rear, this trough or strip 10, may be interchanged at will from the top of a covered automobile or other vehicle 6, to the wind shield 7, and rear of an open automobile or other vehicle, or vice versa.

To give warning of the near approach to a pendant crossing guard, a tell tale may be strung across the travelled way, such as the one long used and known all over the country for many years, to warn men standing on top of freight trains of the near approach to overhead bridges.

It consists of a line stretched across the road from the tops of poles at the sides, with small lines hanging down about a foot apart from this cross line, to attract attention when contacted with.

To give further warning and to prevent the possibility of automobiles or other vehicles colliding with the pendants 4, of the pendant crossing guard unaware to the operators of such, a light 11, with a reflector, may be placed upon each of the uprights 1, to throw the beams of light along the row of pendants 4.

The safety of life and property is of such vast importance that the travelling public and the owners of property are fully justified in requiring operators of automobiles and other vehicles to provide at their own expense the very slight cost of these deflectors 9 and 10, or to hold one or more pendants 4, aside personally and to submit to the very slight inconvenience and loss of time while slowing down and starting up again.

Having thus described my invention what I claim is:

1. In a pendant traffic signal, a support, a plurality of pendants suspended from said support into the path of a fragile portion of a vehicle, the inertia of said pendants being such that the vehicle and possibly the occupants will be injured if the speed of the vehicle is not extremely low.

2. In a pendant traffic signal, a support, a plurality of bars suspended from said support, a vehicle, one or more of said bars extending into the path of said vehicle, and a fragile guard on said vehicle, said guard being adapted to deflect said bar or bars if the speed of said vehicle is sufficiently low, thus permitting safe passage of the vehicle through the crossing guard and ample opportunity for observation of approaching railroad trains.

3. In a pendant traffic signal the combination of the tell tale, the pendants suspended in the path of a vehicle, the deflectors attached to vehicles, and the lights, all of which are hereinbefore described.

ARTHUR M. DEVEREUX.